United States Patent [19]

Miyata et al.

[11] Patent Number: 5,025,166

[45] Date of Patent: Jun. 18, 1991

[54] EXPOSURE APPARATUS FOR COLOR CATHODE RAY TUBES

[75] Inventors: Yukitaka Miyata, Kanagawa; Hiroyuki Wada, Chiba; Takashi Nishimura, Saitama, all of Japan

[73] Assignee: Kabushiki Kaisha Toshiba, Kawasaki, Japan

[21] Appl. No.: 459,429

[22] Filed: Dec. 29, 1989

[30] Foreign Application Priority Data

Feb. 1, 1989 [JP] Japan .................................. 1-023274

[51] Int. Cl.[5] .............................................. G03B 27/00

[52] U.S. Cl. .............................. 250/492.1; 250/504 R; 250/494.1; 313/475; 354/1

[58] Field of Search ............. 250/492.1, 504 R, 494.1; 350/96.1, 96.24; 313/475; 430/24; 354/1

[56] References Cited

U.S. PATENT DOCUMENTS 3,043,179 7/1962 Dunn .................................. 313/475

3,648,576 3/1972 Mears et al. ............................ 354/1

4,523,806 6/1985 Kojima et al. .................. 250/492.1

4,576,435 3/1986 Nishioka ......................... 350/96.24

*Primary Examiner*—Jack I. Berman

*Assistant Examiner*—Kiet T. Nguyen

*Attorney, Agent, or Firm*—Oblon, Spivak, McClelland, Maier & Neustadt

[57] ABSTRACT

An exposure apparatus for color cathode ray tube having a single faceplate with a phosphor screen on an inner surface thereof comprises light source device including an initial light source for emitting ultraviolet light, exposure device including a base for supporting the faceplate with a photosensitive layer having a plurality of sub-regions to form the phosphor screen, a plurality of secondary light sources emitting exposure light for exposing corresponding sub-regions and moving device for shifting position of the secondary light sources, and light distribution device for equally distributing a part of ultraviolet light emitted from the light source device to the secondary light sources.

7 Claims, 7 Drawing Sheets

EXPOSURE APPARATUS FOR COLOR CATHODE RAY TUBES

BACKGROUND OF THE INVENTION

This invention relates to an exposure apparatus for production of a phosphor screen of a cathode ray tube and more particularly, relates to an exposure apparatus for production of the phosphor screen of multineck color cathode ray tubes.

Recently, for the color display tube with a large-sized screen and a sufficient high degrees of brightness and resolution, a multineck color cathode ray tube has been proposed. For example U.S. Pat. No. 4,714,856 discloses a cathode ray tube, which includes a phosphor screen formed on an inner surface of a single glass panel and 12 electron gun assemblies provided in necks. In accordance with the electron gun assemblies, the phosphor screen has 12 effective areas for reproduction of images. Each electron gun assembly emits three electron beams for bombarding phosphor stripes of red, green and blue formed in the corresponding effective area of the phosphor screen. Deflection yokes are provided outside funnels which connect the necks to the panel, respectively.

During operation of the tube, the electron beams emitted from the electron gun assemblies scan the corresponding effective areas due to the deflection yokes, respectively, and thus images with the high brightness and resolution can be reproduced on the large phosphor screen, entirely.

For formation of such phosphor screen with large size, an exposure apparatus shown in FIG. 1 can be considered. Namely, as an extention of the exposure apparatus used for formation of the phosphor screen with an ordinary size, such as 20 inches-size or the less, the exposure apparatus 1 includes a housing 2 divided into cells *2a, 2b, 2c* and *2d,* a plurality of light sources *3a, 3b, 3c* and *3d,* such as a mercury lamp or xenon lamp, for exposing predetermined regions corresponding to the effective areas of the phosphor screen, respectively. Correction lenses *4a, 4b, 4c* and *4d* and intensity correction filters *5a, 5b, 5c* and *5d* are placed above the light sources *3a, 3b, 3c* and *3d* for correct exposure. On the top of the apparatus 1, is placed a panel 6 with a photosensitive layer 7 formed on an inner surface of the panel 6 for forming phosphor stripes of red, green and blue, and light absorbing stripes between the phosphor stripes. A shadow mask 8 is placed inside the panel 6.

Many problems have occurred when the apparatus shown in FIG. 1 is used for formation of the large-sized phosphor screen for the multineck tubes. Namely, it is hard to uniformely form the phosphor stripes and light absorbing stripes in sizes and pitches, since keeping the intensity of all light sources to be constant for a long duration is not easy. Also, since the distance between neighboring light sources are very small, mechanism of cooling system and moving system of the light sources are extremely complicated and required to be accurate.

In Japanese Utility Model Disclosure No. 51-30462, is disclosed an exposure apparatus for formation of the light absorbing stripes coating of the phosphor screen. The apparatus includes a light source, such as a mercury lamp, and three light conductors, each of which is composed of a plurality of optical fibers, for transmitting the lights from the light source. Inlets of the conductors are bundled and placed adjacent to the light source so as to receive the lights from the light source. Outlets of the conductors are disposed at predetermined positions, respectively.

By using the apparatus, since the light absorbing stripes can be formed by only once exposure, the duration of exposure time can be reduced. However, since intensity of the light emitted from the lamp significantly decreases at the point slightly shifted from a center of the lamp where light intensity is maximum value, illuminance amounts emitted from the outlets are different. As the result, the stripes are not formed, uniformly.

SUMMARY OF THE INVENTION

An object of this invention is to provide an exposure apparatus which can uniformly form a phosphor screen for large-sized color cathode ray tubes.

Another object of the invention is to provide an exposure apparatus with a plurality of secondary light sources which can uniformly emit exposure light.

Further object of the invention is to provide an exposure apparatus with a simple construction.

Still further object of the invention is to provide an exposure apparatus suitable for multineck color cathode ray tubes.

Therefore, the invention may provide an exposure apparatus for color cathode ray tubes having a single faceplate with a phosphor screen on an inner surface thereof comprising light source means including an initial light source for emitting ultraviolet light, exposure means including a base for supporting the faceplate with a photosensitive layer formed on the inner surface thereof to form the phosphor screen and having a plurality of sub-regions, a plurality of secondary light sources emitting exposure light for exposing respective sub-regions of the photosensitive layer and moving means for shifting each position of the secondary light sources at predetermined positions, and light distribution means for equally distributing a part of ultraviolet light emitted from the light source means to the secondary light sources.

According to the invention, since ultraviolet light with equal intensity are transmitted to the secondary light sources due to the light distribution means, all of exposure light emitted from the secondary light sources have almost same intensity. Consequently, the phosphor screen with large size is uniformely formed.

DETAILED DESCRIPTION OF PREFERRED EMBODIMENT

Figure 1:
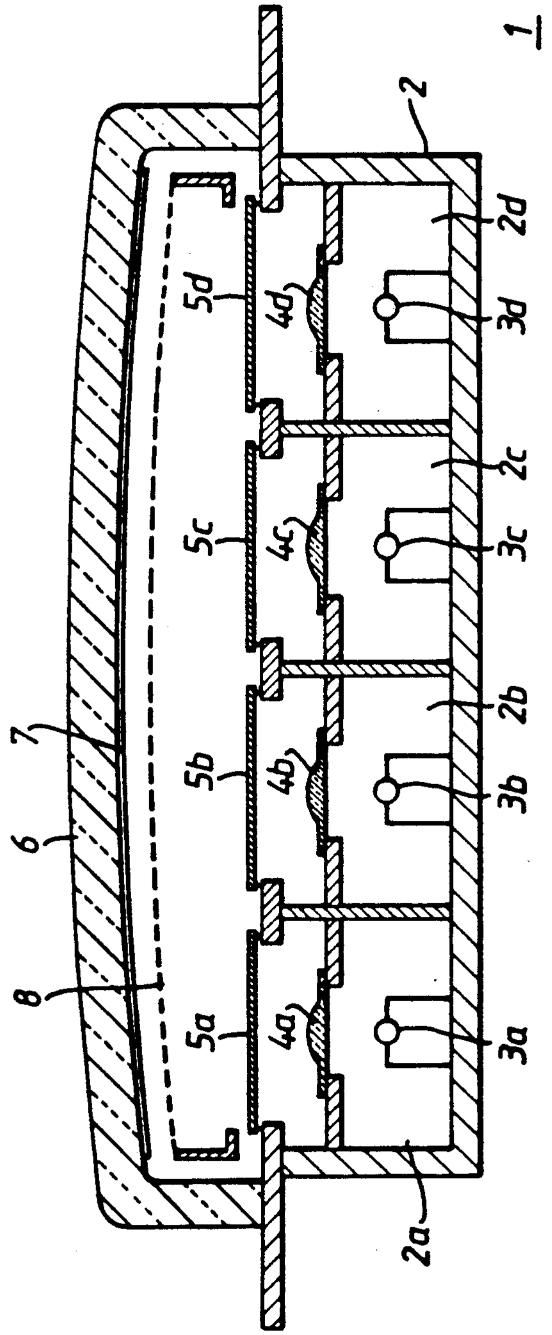
Fig.1. PRIOR ART
FIG. 1 shows a cross-sectional view of a conventional exposure apparatus.
Figure 2:
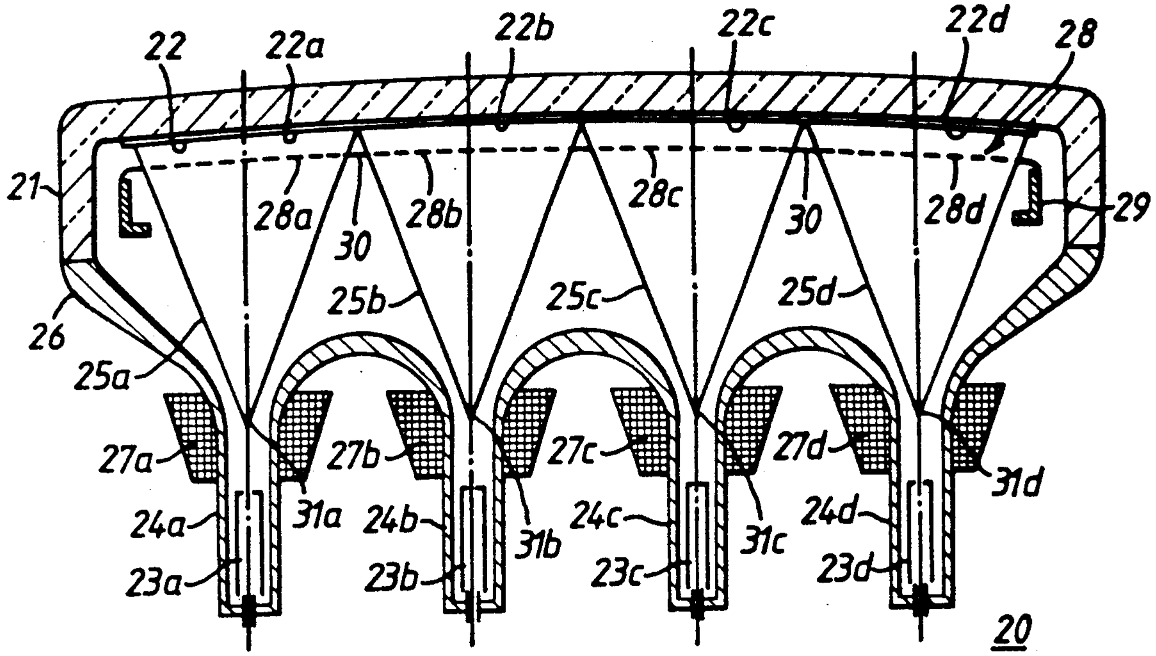
FIG. 2 shows a cross-sectional view of a color cathode ray tube with a large-sized phosphor screen formed by using an exposure apparatus according to the invention.

Preferred embodiment of this invention will be explained with reference to the accompanying drawings. FIG. 2 shows a color cathode ray tube with a large-sized phosphor screen which has been formed be using an exposure apparatus according to the preferred embodiment. In FIG. 2, the cathode ray tube 20 includes a single panel 21 with a phosphor screen 22 formed on an inner surface of the panel 21. The phosphor screen 22, which comprises a plurality of phosphor stripes horizontally extending for emitting red, green and blue lights and light absorbing stripes interposed between the phosphor stripes, is divided into sixteen scanning sub-regions 22*a*, 22*b*, 22*c* and 22*d*, four scanning regions vertically and four scanning sub-regions horizontally. Corresponding to the sub-regions 22*a*, 22*b*, 22*c* and 22*d*, sixteen electron guns 23*a*, 23*b*, 23*c* and 23*d* are provided in sixteen necks 24*a*, 24*b* 24*c* and 24*d*, respectively. Each electron guns 23*a*, 23*b*, 23*c* and 23*d* emits three electron beams 25*a*, 25*b*, 25*c* and 25*d* for bomberding the phosphor stripes in corresponding scanning sub-regions 22*a*, 22*b*, 22*c* and 22*d* for emitting red, green and blue lights. In the drawing, three electron beams are shown by a single line for simplification. The necks 24*a*, 24*b*, 24*c* and 24*d* are connected to the panel 21 by a funnel 26. Sixteen deflection yokes 27*a*, 27*b*, 27*c* and 27*d* are attached to the outside of the funnel 26 for deflecting the electron beams 25*a*, 25*b*, 25*c* and 25*d* on the scanning sub-regions 22*a*, 22*b*, 22*c* and 22*d*, respectively.

Figure 3:
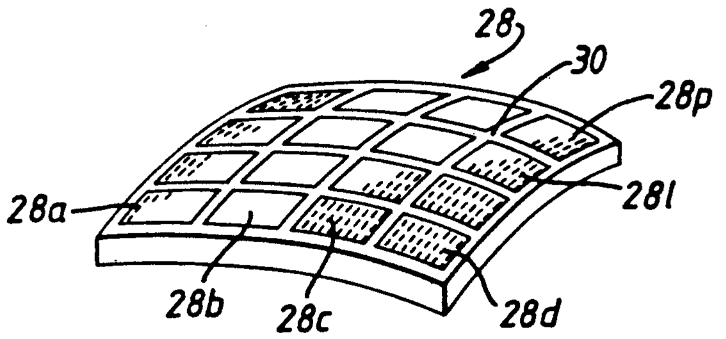
FIG. 3 shows a perspective view of a shadow mask shown in FIG. 2.

In the panel 21, a shadow mask 28 is disposed by supporting a plurality of panel pins (not shown) through a mask frame 29 so as to have a predetermined distance between the phosphor screen 22 and the shadow mask 28. As shown in FIG. 3, the shadow mask 28 has sixteen effective areas 28*a*, 28*b*, 28*c* . . . and 28 *p* with a plurality of apertures for passage of the electron beams 25*a*, 25*b*, 25*c* and 25*d*, and non-effective portion 30 without aperture for isolating the effective areas 28*a*, 28*b*, 28*c* . . . and 28 *p*. The effective areas 28*a*, 28*b*, 28*c* . . . and 28*p* respectively correspond to the scanning sub-regions 22*a*, 22*b*, 22*c* and 22*d*. The non-effective portion 30 prevents the electron beams from bomberding neighboring scanning sub-regions.

During operation of the tube 20, the electron beams 25*a*, 25*b*, 25*c* and 25*d* emitted from the electron guns 23*a*, 23*b*, 23*c* and 23*d* are deflected around deflection centers 31*a*, 31*b*, 31*c* and 31*d* so as to scan over the scanning sub-regions 22*a*, 22*b*, 22*c* and 22*d*, respectively. Consequently, large-sized images are reproduced on the phosphor screen 22 as a composite image of unit images reproduced on the scanning sub-regions 22*a*, 22*b*, 22*c* and 22*d* by deflection of the beams 25*a*, 25*b*, 25*c* and 25*d*.

The exposure apparatus 40 used for formation of the phosphor screen mentioned above is shown in FIG. 4. The exposure apparatus 40 according to the invention has an exposure device 41, a light source device 42 for emitting ultraviolet light and a light distribution device 43 for equally distributing ultraviolet light from the light source device 42 to the exposure device 41.

The exposure device 41 has a rectangular box-shaped frame 44 with the upper side opening. The space inside the frame 44 is divided into sixteen compartments 45*a*, 45*b*, 45*c* and 45*d* by dividing plate 46 provided in a lattice form. The compartments 45*a*, 45*b*, 45*c* and 45*d* correspond to the scanning sub-regions 22*a*, 22*b*, 22*c* and 22*d* of the phosphor screen to be formed. In the compartments 45*a*, 45*b*, 45*c* and 45*d*, secondary light sources 47*a*, 47*b*, 47*c* and 47*d*, correction lenses 48*a*, 48*b*, 48*c* and 48*d*, and light quantity correction filter 49*a*, 49*b*, 49*c* and 49*d* are respectively disposed to construct exposure unit. The secondary light sources 47*a*, 47*b*, 47*c* and 47*d* are supported by shift tables 50*a*, 50*b*, 50*c* and 50*d* in order to be shifted the positions thereof in a horizontal direction (left and right directions in FIG. 4).

On the top of the frame 44, a supporting plate 51, which has sixteen openings corresponding to the compartments 45*a*, 45*b*, 45*c* and 45*d*, is provided for supporting the panel 21. On an inner surface of the panel 21, a photosensitive layer 52 is formed for formation of the phosphor screen. The photosensitive layer 52 has sixteen exposing sub-regions 52*a*, 52*b*, 52*c* and 52*d* to be exposed by ultraviolet light emitted from the secondary light sources 47*a*, 47*b*, 47*c* and 47*d*. The shadow mask 28 with the effective areas 28*a*, 28*b*, 28*c* and 28*d* and non-effective portion 30 is disposed in the panel 21 by support of the pins through the mask frame 29, as previously described.

Shielding plates 53 are provided on the supporting plate 51 in a lattice form same as the dividing plate 46 to divide the space inside the panel 21 into sixteen areas corresponding to the exposing sub-regions 52*a*, 52*b*, 52*c* and 52*d*. The shield plates 53 eliminate an undesirable interaction between ultraviolet light radiated from neighboring secondary light sources during exposure. Namely, in the type of the color cathode ray tube shown in FIG. 2, the shadow mask 28 has the non-effective portion 30 for blocking passage of the undesirable electron beams in order that images (rasters) reproduced by the electron beams do not overlap with each other, even if the electron beams are scanned beyond the predetermined scanning sub-regions.

Figure 5:
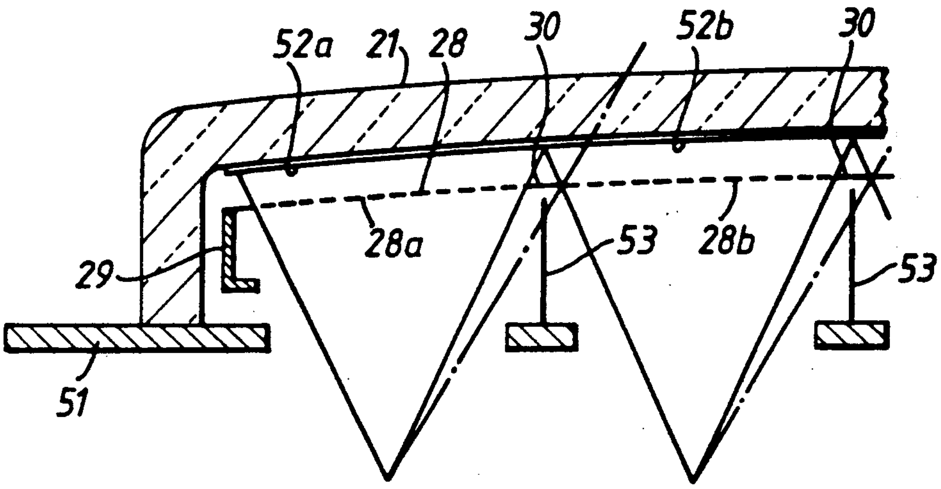
FIG. 5 shows a cross-sectional view of the panel for explanation of the operation of the exposure apparatus shown in FIG. 4.

Also, during exposure of the photosensitive layer 52, the non-effective portion 31 blocks exposure light from the secondary sources 47*a*, 47*b*, 47*c* and 47*d* to expose neighboring exposing sub-regions 52*a*, 52*b*, 52*c* and 52*d* in some degree. However, such undesirable exposure light cannot be completely blocked by the non-effective portion 31 alone. Therefore, the shield plate 53 is necessary to successfully expose the photosensitive layer 52. Namely, as shown in FIG. 5, the shield plate 53 can completely shield undesirable exposure light shown by the chain lines. Accordingly, due to the shield plate 53 and non-effective area 31, the exposure light is prevented from mutual interference. Thus, the exposing sub-regions corresponding to the scanning sub-regions are successfully exposed by the exposure light from the secondary light source.

In this embodiment, all shield plates 53 extend to the extent that the distances between the surface of the shadow mask 28 and the top of the shield plates are 5 mm. So, hight of the shield plates 53 are different each other due to curvature of the shadow mask surface.

The light source device 42 includes a light shield case 54, an initial light source 55, such as an air-cooled ultra high pressure mercury lamp with an output power of 1 kw, which is disposed in the case 54 for emitting ultraviolet light with wave length of 365 nm, and focusing lens system 56 for focusing the light from the initial light source 55.

Figure 6:
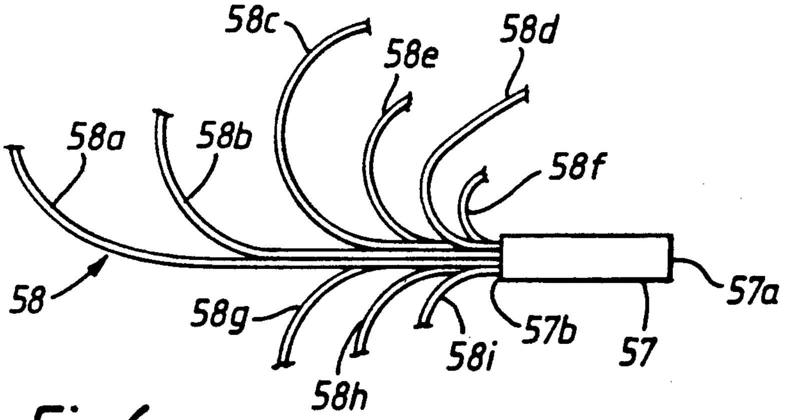
FIG. 6 shows a side view of a light distribution member shown in FIG. 4.

As shown in FIG. 6, the light distribution device 43 includes a light diffusing rod 57 made of a transparent glass, such as quartz, and a plurality of light conductors 58, such as a optical fiber. On the incidence end 57*a* of the rod 57, a spot of ultraviolet light passing through the focusing lens system 56. An output end 57*b* of the rod 57 is optically contacted with one end 59 of the light conductors 58 for transferring the ultraviolet light transmitting in the rod 57. Another ends of the conductors 58 are divided into a plurality of branches 58*a*, 58*b*, . . . 58*h* and 58*i* for equally distributing a part of ultraviolet light from the output end 57*b*. The number of the branches 58*a*, 58*b*, . . . 58*h* and 58*i* corresponds to the number of the exposing sub-regions. Namely, the light conductors 58 are divided into sixteen branches in this embodiment. For example, the conductors 58 comprises 1600 optical fibers which are bundled at one end to have a diameter of 20 mm for contacting with the output end 57*b* and are divided into 16 branches, in the case of the embodiment.

In the light distribution device 43, ultraviolet light projected on the incidence end 57*a* uniformely spreads in the diffusion rod 57 during transmitting the diffusion rod 57 due to total deflection at the pheriphery of the rod 57. As a result, the ultraviolet light emitted from the output end 57*b* has uniform intensity. Therefore, the ultraviolet light with unform intensity is distributed to each branches 58*a*, 58*b*, . . . 58*i*. The ends of the branches 58*a*, 58*b*, . . . 58*i* are supported in the secondary light sources 47*a*, 47*b*, 47*c* and 47*d*.

Figure 7:
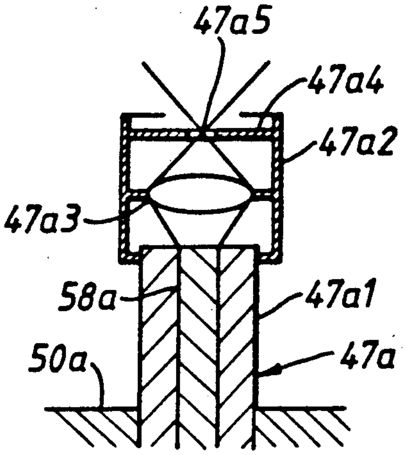
FIG. 7 shows a cross-sectional view of a secondary light source shown in FIG. 4.

The secondary light source 47*a* includes a holder 47*a*1, for supporting another end of the branch 47*a*, as shown in FIG. 7. The holder is fixed to a shift table 50*a*. The secondary light source 47*a* also includes a case 47*a*2, focusing lens system 47*a*3 for adjusting a spread angle of exposure light from another end of the branches 58*a* and a hole plate 47*a*4 provided a pin-hole 47*a*5 with a diameter of 1 mm.

The secondary light source 47*a* emits exposure light with a spread angle of 90°, and thus, the light can sufficiently expose a circular area with a diameter of about 40 mm on the photosensitive layer 52. It should be noted that the position of the secondary light source 47*a* is adjusted when exposed in order that exposure light is emitted from the position corresponding to the deflection center of the scanning sub-region (or exposing sub-regions). In other words, the pin-hole 47*a*5 should be positioned at the position corresponding to the deflection center.

During exposure, ultraviolet light emitted from the initial light source 55 is projected on the incidence end 57*a*. The light is transmits in the diffusion rod 57 and spreads over the diffusion rod 57. At the output end 57*b*, the light is uniformly divided and transmits in the branches 58*a*, 58*b*, . . . and 58*i*. The light is radiated from the secondary light sources 47*a*, 47*b*, 47*c* and 47*d* for exposing the exposing sub-regions 52*a*, 52*b*, 52*c* and 52*d*. Since ultraviolet light emitted from the initial light source 55 with a acute intensity distribution is distributed to the secondary light sources 47*a*, 47*b*, 47*c* and 47*d* after transmitting the diffusion rod 57 and the light conductors 58, intensity of the light radiated from the secondary light sources are uniform. Consequently, the phosphor screen can be formed, uniformly.

Figure 4:
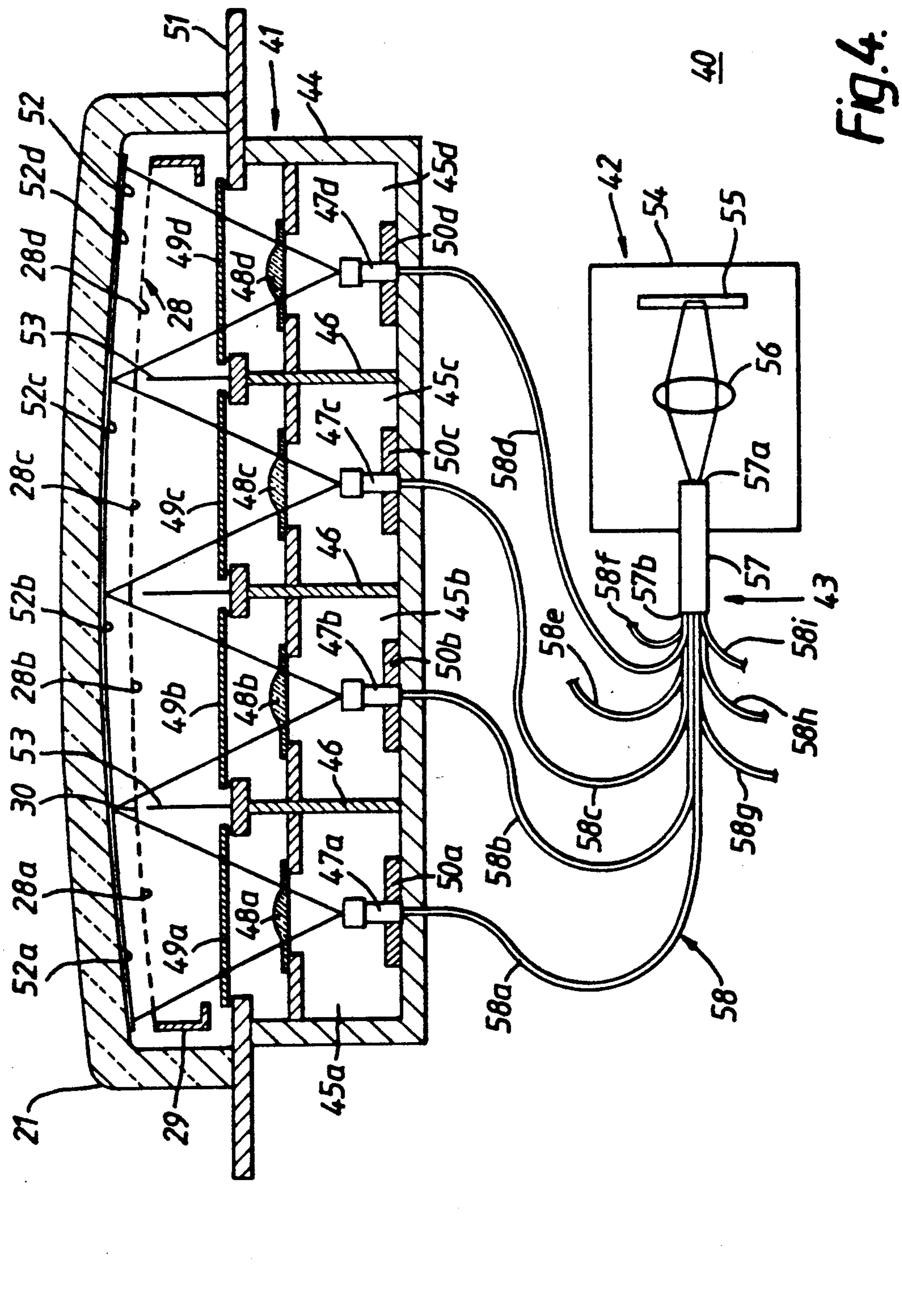
FIG. 4 shows a cross-sectional view of an exposure apparatus according to the preferred embodiment of this invention.
Figure 8:
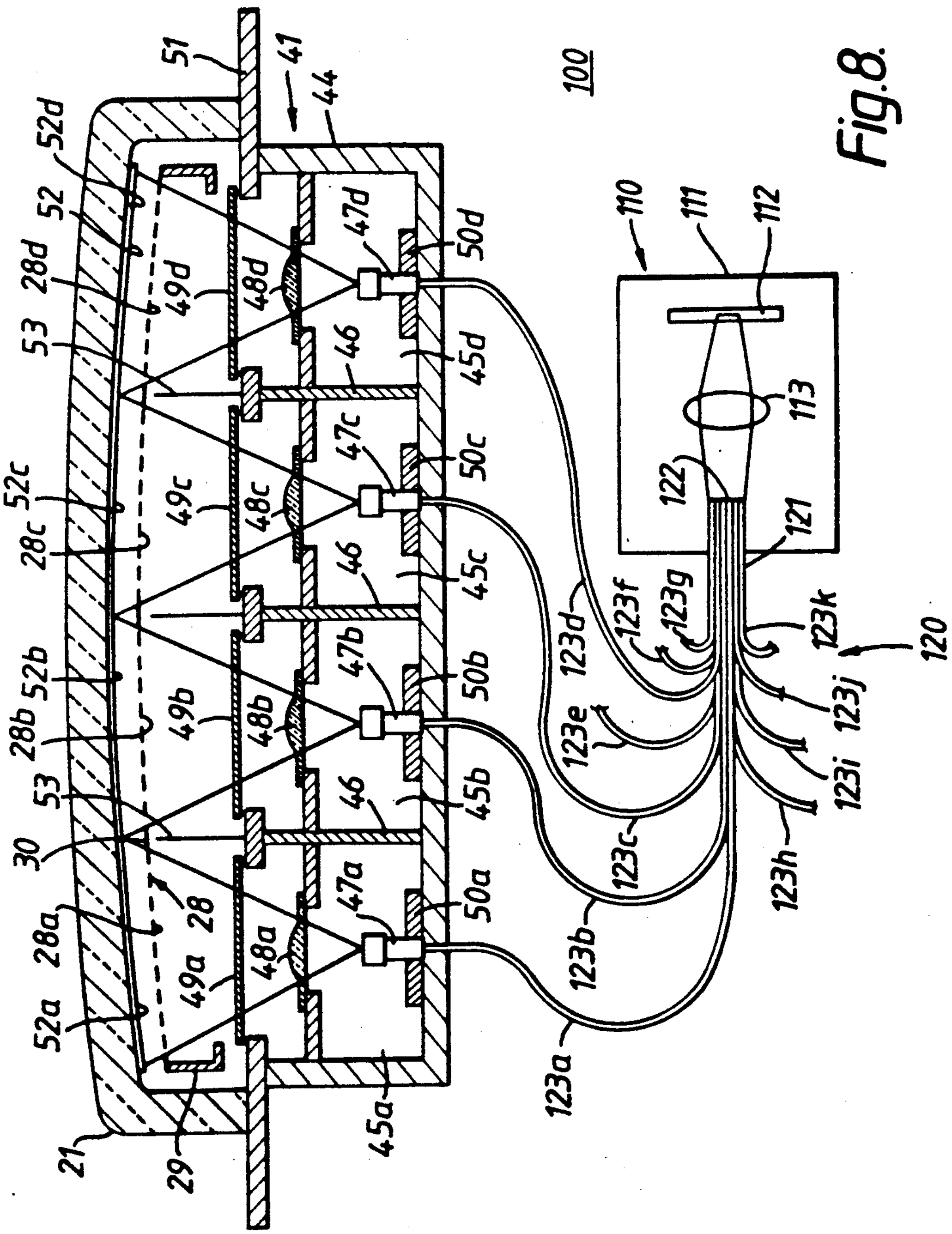
FIG. 8 shows a cross-sectional view of an exposure apparatus according to another embodiment of the invention.
Figure 9:
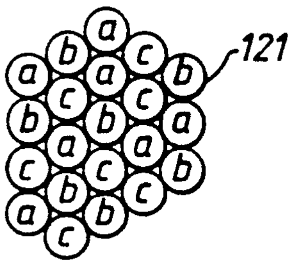
FIG. 9 shows a plane view of one end of light conductors shown in FIG. 8.

Another embodiment will be explained with reference to FIGS. 8, 9 and 10. In FIG. 8, same portions as the portions shown in FIG. 4 are given the same number in FIG. 4.

An exposure apparatus 100 shown in FIG. 8 has an exposure device 41, a light source device 110 and a light distribution device 120 for equally distributing ultraviolet light from the light source device 110 to the exposure device 41.

The exposure device 41 has the rectangular box-shaped frame 44 with the upper side opening. The space inside the frame 44 is divided into sixteen compartments 45*a*, 45*b*, 45*c* and 45*d* by dividing plate 46. The compartments 45*a*, 45*b*, 45*c* and 45*d* correspond to the exposing sub-regions 52*a*, 52*b*, 52*c* and 52*d* of the photosensitive layer 52. In the compartments 45*a*, 45*b*, 45*c* and 45*d*, secondary light sources 47*a*, 47*b*, 47*c* and 47*d*, correction lenses 48*a*, 48*b*, 48*c* and 48*d*, and light quantity correction filters 49*a*, 49*b*, 49*c* and 49*d* are respectively disposed to construct exposure unit. The secondary light sources 47*a*, 47*b*, 47*c* and 47*d* are supported by shift tables 50*a*, 50*b*, 50*c* and 50*d*.

On the top of the frame 44, the supporting plate 51 is provided for mounting the panel 21. The panel 21 has the photosensitive layer 52 on the inner surface. In the panel 21, the shadow mask 28 is disposed by support of the pins through the mask frame 29. The photosensitive layer 52 has sixteen sub-regions 52*a*, 52*b*, 52*c* and 52*d* to be exposed and the shadow mask 28 has sixteen effective areas 28*a*, 28*b*, 28*c* and 28*d* with apertures.

Shielding plates 53 are provided on the supporting plate 51 for elimination of an undesirable interaction between exposure lights during exposure.

The light source device 110 includes a light shield case 111, an initial light source 112, which is disposed in the case 111 for emitting ultraviolet light, and focusing lens system 113 for focusing the light from the initial light source 112. As the light source 112, an air-cooled ultra high pressure mercury lamp with an output power of 1 kw, which emits ultraviolet light with wave length of 365 nm, may be used, for example.

The light distribution device 120 is composed of a plurality of light conductors 121, such as an optical fiber. The conductors 121 are bundled at one end for forming an inlet 122 on which a spot of ultraviolet light through the focusing lens system 113 is projected. Another end of the conductors 121 are divided into sixteen groups so as to construct branches 123*a*, 123*b*, . . . and 123*k*. Each end of the branches 123*a*, 123*b*, . . . and 123*k* is supported by the holder of the corresponding secondary light sources 47*a*, 47*b*, 47*c* and 47*d*.

Since ultraviolet light emitted from the end of the branches 123*a*, 123*b*, . . . and 123*k*, as the exposure light, simultaneously expose the exposing sub-regions 52*a*, 52*b*, 52*c* and 52*d* for formation of the phosphor screen, it is necessary that all of the exposure lights exposing have substantially same intensity for formation of uniform phosphor screen. However, as compared with the light distribution device according to the embodiment previously mentioned, since the light distribution device 120 does not have diffusion rod, the intensity of ultraviolet light projected to each light conductors 121 differ greatly between the conductors at center and periphery of the bundled end of the conductors 121 due to an acute intensity distribution of the initial light source 112. So, if another end of the conductors 121 are divided into groups to form branches without any consideration for intensity equalization of the light emitted from the ends of the branches, it would be hard that the exposing sub-regions are exposed, equally.

Figure 10A:
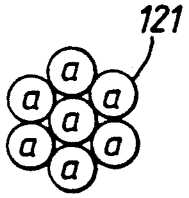
FIGS. 10A, 10B and 10C show a plane view of another end of the light conductors shown in FIG. 8.
Figure 10B:
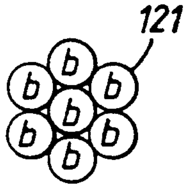
Figure 10C:
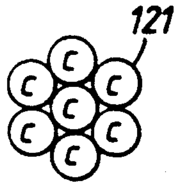
Figure 11:
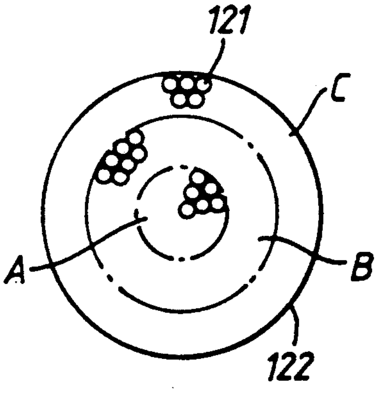
FIG. 11 shows a plane view of an inlet of a bundled light conductors.

Therefore, another ends of the conductor 121 are divided into groups at random to form branches 123*a*, 123*b*, and 123*k*. Consequently, the intensities of the exposure light emitted from the branches are made equal. Namely,. twenty-one light conductors 121 with same mark a, b and c in FIG. 9 are gathered each other so that the light conductors 121 are divided into three groups at random, as shown in FIGS. 10A, 10B and 10C. For example, 1600 optical fibers are bundled at one end and are divided into 16 branches at random. However, it is possible that the intensity of exposure light projected on the inlet 122 of the conductors 121 is not uniform due to influence of the focusing lens system 113. In this case, each of 16 branches is composed of another ends of the optical fibers which are selected from the fibers located in the area A, B and C of the inlet 122 shown in FIG. 11. More precisely, the optical fibers of which one ends are located in the area A are divided into 16 groups X at random. Also, the optical fibers of which one ends are located in the areas B and C are divided into 16 groups y and Z. respectively. Finally, the 16 branches are formed by gathering the groups X, Y and Z. Consequently, the intensities of the exposure light emitted from the branches are made equal. The sizes of the areas A, B and C depend on intensity distribution of the exposure light projected on the inlet 122.

Figure 12:
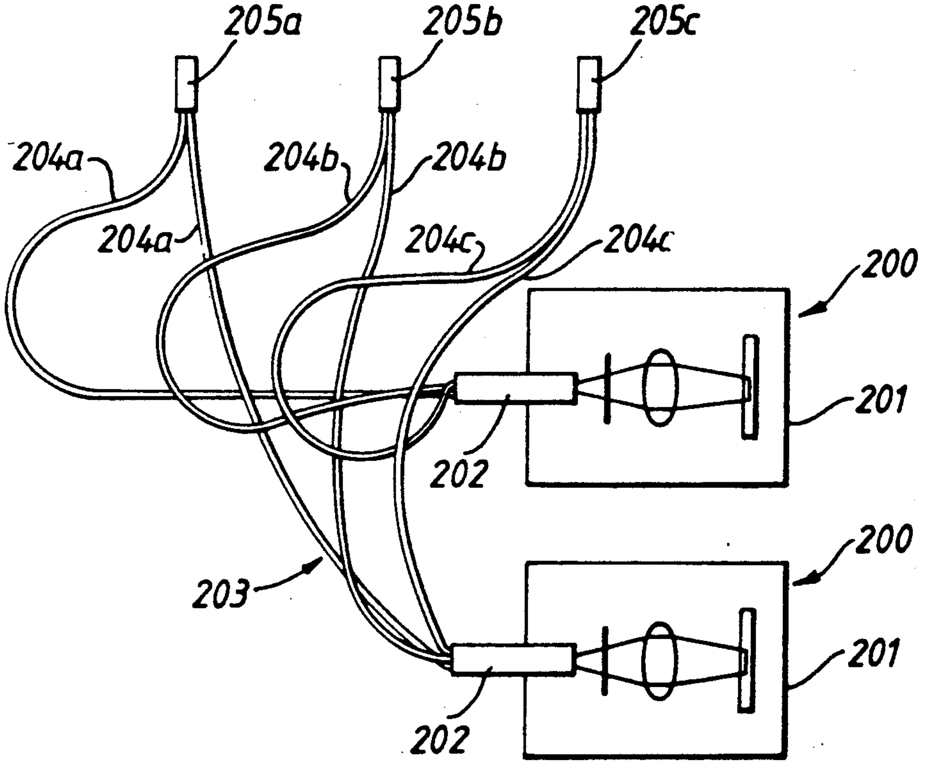
FIG. 12 shows a side view of a part of the exposure apparatus according to the other embodiment of the invention.

As shown in FIG. 12, more than 2 sets of light source units 200, each of which includes a light source device 201, a light spliter 202 and light conductors 203, may be used, when the intensity of exposure light exposed on the photosensitive layer is insufficient. One ends of the conductors 203 are bundled and optically coupled with the light spliter 202. Another ends of the conductors 203 are divided into predetermined number of branches 204*a*, 204*b* and 204*c*. The branches 204*a*, 204*b* and 204*c* are unitized at ends 205*a*, 205*b* and 205*c*.

In the exposure apparatus of this invention, half-mirrors which have different reflectivity and prisms may be used for spliting ultraviolet light emitted from the light source device.

Also, a concave mirror which have focusing action, instead of the focusing lens in the light source device.

Incidentally, in the embodiment, light shielding plates 53 are provided on the supporting plate 51. However, other light shielding devices can be provided in the vicinity of the correction lenses, the light quantity correction filters or the secondary light sources.

Also, in case when the exposure light (ultraviolet light) from the secondary light sources has a very sharp directivity and interference of the exposure light in adjacent areas can be omitted, the light shielding device, such as the light shielding plate are not necessary.

The correction lens and light quantity correcting filter can be incorporated as a unit with focusing lens system and hole plate in the secondary light source.

Since the focusing lens system in the secondary light source is intended to widen the effective width of the exposure light, concave lenses or combination of multiple lenses can be used as the focusing lens system.

The hole plate in the secondary light source is not necessary for practical use in cases that the diameter (or the optical object point) of the exposure light emitted from the secondary light source is sufficiently small.

What is claimed is:

1. An exposure apparatus for color cathode ray tubes having a single faceplate with a phosphor screen on an inner surface thereof comprising:

light source means including an initial light source for emitting ultraviolet light;

exposure means including a base for supporting the faceplate with a photosensitive layer formed on the inner surface thereof to form the phosphor screen and having a plurality of sub-regions, a plurality of secondary light sources emitting exposure light for exposing respective sub-regions of the photosensitive layer, and moving means for shifting each position of the secondary light sources at predetermined positions; and light distribution means for equally distributing a part of ultraviolet light emitted from the light source means to the secondary light sources.

2. The exposure apparatus of claim 1 wherein the light distribution means includes light diffusion means for spreading and transmitting ultraviolet light projected on an inlet of the light diffusion means towards an outlet of the light diffusion means and light transmission means for transmitting a part of ultraviolet light from the outlet of the light diffusion means to the secondary light sources.

3. The exposure apparatus of claim 2 wherein the light diffusion means includes a transparent rod and the light transmission means includes a plurality of optical fibers having one end bundled and optically coupled with one end of the rod and another end divided into predetermined groups optically coupled with the secondary light sources.

4. The exposure apparatus of claim 1 wherein the light distribution means includes a plurality of optical fibers having one end bundled and optically coupled with the light source means, and another ends gathered at random so as the form predetermined number of groups and optically coupled with the secondary light sources.

5. The exposure apparatus of claim 1 wherein the exposure means further includes light shield for preventing interaction between ultraviolet light emitted from neighboring secondary light sources.

6. The exposure apparatus of claim 1 wherein the secondary light sources are respectively disposed at the position corresponding to the deflection centers of the sub-regions of the phosphor screen to be formed.

7. The exposure apparatus of claim 1 wherein the secondary light sources respectively include correction means for adjusting an dispersion angle of exposure light emitted from the secondary light sources.

* * * * *